United States Patent [19]

Holsinger

[11] 3,818,347

[45] June 18, 1974

[54] RECEIVER FOR AMPLITUDE MODULATED QUADRATURE CARRIER SIGNALS

[75] Inventor: Jerry L. Holsinger, Burlington, Mass.

[73] Assignee: Intertel, Inc., Burlington, Mass.

[22] Filed: Oct. 10, 1972

[21] Appl. No.: 296,025

[52] U.S. Cl. .................... 325/321, 325/42, 325/419
[51] Int. Cl. ............................................ H04l 27/06
[58] Field of Search.......... 325/63, 38 R, 38 A, 321, 325/322, 324, 326, 419, 420, 421, 422, 42, 65; 179/15.55 R; 328/133, 134, 155; 178/66 R, 69 R; 333/18 R

[56] References Cited

UNITED STATES PATENTS

| | | | |
|---|---|---|---|
| 3,289,082 | 11/1966 | Shumate | 178/66 R |
| 3,391,339 | 7/1968 | Lynch | 179/15 BP |
| 3,522,537 | 8/1970 | Boughtwood | 325/63 X |
| 3,566,036 | 2/1971 | Roche et al. | 325/63 |

*Primary Examiner*—Benedict V. Safourek
*Attorney, Agent, or Firm*—Cesari and McKenna

[57] ABSTRACT

A receiver for amplitude-modulated quadrature carrier signals which contain data. Balanced demodulators recover demodulated data signals which are decoded to regenerate the data. Various control circuits monitor the demodulated data signals and based upon the data these signals represent, generate an error signal which indicates the quality of the recovered demodulated data signals. The control circuits control the operation of a local oscillator, which connects to the demodulators, or decoder which retains the data, to improve the quality as necessary by adjusting oscillator phase or decoder timing. In one embodiment, incoming carrier gain is also controlled.

18 Claims, 8 Drawing Figures

PATENTED JUN 18 1974

3,818,347

RECEIVER FOR AMPLITUDE MODULATED QUADRATURE CARRIER SIGNALS

BACKGROUND OF THE INVENTION

This invention relates to recovering data from modulated carrier wave signals and more specifically to a receiver for recovering digital data from amplitude-modulated quadrature carrier signals.

There are several specific methods for transferring data, especially data in digital form, between remote locations. These methods are generally called "amplitude-modulated quadrature carrier" methods. In one specific embodiment, incoming digital data signals, known as "bits," are applied to a transmitter at a rate known as the "bit rate." Successive pairs of these data signals (designated as "bauds") modulate two carrier signals which are at the same frequency but are displaced in phase. These modulated data signals are combined to generate a carrier signal which thus contains the data in the form of phase shifts occurring at a baud rate.

With this type of data transmission, the receiver must perform two operations to recover the digital data. First, it must recover demodulated data signals. Prior receivers use either synchronous (also known as "coherent" or "homodyne") detection or incoherent detection to recover demodulated data signals. This invention has particular application to systems which use synchronous detection.

In a synchronous detection system, a local oscillator provides a local carrier signal for demodulating the incoming carrier signal. Generally it has been thought that this local carrier signal must be at the same phase and frequency as the incoming carrier signal to insure accurate decoding. Hence, receivers generally include phase lock loops to maintain the relationship between the incoming and local oscillator signals.

An incoming signal is sampled successively in one such phase lock loop. A phase comparator monitors any phase shift which occurs between successive samplings using analog circuits. If the phase shift lies outside predetermined and expected limits, correction circuits alter the phase of the local oscillator to synchronize it with the incoming signal.

Another phase lock loop uses two local oscillators. A mixer beats the incoming signal against a first oscillator output signal to obtain an intermediate signal which has a frequency equal to the sum of the incoming signal and first oscillator frequencies. The second oscillator operates at the same frequency as the intermediate signal. Comparison circuits monitor the zero crossings of both the intermediate and second oscillator signals and control the second oscillator to maintain its output in phase with the intermediate signal.

As a second operation, the receiver must convert demodulated data signals recovered from the carrier into digital form. This is accomplished by means of a phase decoder controlled by a periodic strobe signal. The phase decoder determines the phase shift between successive bauds and converts this differential phase shift information into conventional digital form. Phase decoders of this type generally operate so the strobe signal normally occurs at the center of a baud time as defined by an undistorted eye pattern.

Prior systems maintain the strobe signal in the center of the baud with circuits which generally include an oscillator running at a much higher frequency than the strobe frequency. Conventional frequency dividers convert the high-frequency oscillator output to a strobe signal at the desired frequency. Sensing circuits determine the beginning and the ending of a baud time and then effectively add or inhibit single counts at a high frequency level to advance or delay the time that the strobe signal appears.

Some synchronous detection systems use automatic gain control circuits for the incoming carrier signal. These circuits are particularly important when the amplitude modulated envelope on the carrier contains data. Prior systems use the automatic gain circuit to correct the incoming signals to specific values.

When the local oscillator signal, strobe signal and optional automatic gain control signals are controlled in accordance with the prior art, transmission errors are still encountered especially as transmission rates increase. Theoretically these controls should provide a zero error rate but they do not. In practical applications transmission line characteristics and circuit instabilities distort the amplitude and phase of the incoming signal. At higher data transmission rates, (e.g., 2,400 bits per second or greater), this distortion can lead to inaccurate decoding.

Therefore, it is an object of this invention to minimize data errors caused by distortion during data transmission.

Still another object of this invention is to control the phase of a local oscillator in a synchronous demodulator to minimize data errors caused by distortion.

Yet another object of this invention is to control the phase decoder timing to minimize data errors caused by distortion.

Another object of this invention is to control the amplification of an incoming signal to minimize data errors caused by distortion. Summary As known in the art, an oscilliscope trace of demodulated data signals which occur during the transmission of random digital data defines an "eye pattern." Basically, I have found that error rates can be minimized by controlling the local oscillator frequency, the timing of decoding operations and amplification of the incoming signal to maximize eye opening. Specifically, I have found that the maximum eye opening does not always occur, as the prior art suggests, when the local oscillator frequency is exactly in phase with the incoming signal. Rather it sometimes occurs when the local oscillator frequency is slightly out of phase with the incoming signal. Further, I have found that the eye opening at the time of decoding may be maximized by moving the decoding time away from the center of a baud time as defined by an undistorted eye pattern. It is also possible to improve the eye by changing the chain of amplifiers for the incoming signal, especially if the amplitude of the modulated data signal also contains data information.

Therefore, in accordance with my invention, a receiver contains one or more parameter control circuits for maximizing eye opening. Each circuit corrects a parameter such as oscillator phase, decoder timing or receiver gain by measuring the errors between the expected value of demodulated data signals and the actual demodulated data signals.

Each control circuit then alters its respective parameter to return the recovered demodulated data signals to their correct values. If the receiver contains two or more of these control circuits, they interact to maximize the eye opening at the time the recovered demodulated data signals are sampled to generate the digital data.

This invention is pointed out with particularity in the appended claims. A more thorough understanding of the above and further objects of this invention may be attained by referring to the following description taken in conjunction with the accompanying drawings.

DESCRIPTION OF ILLUSTRATIVE EMBODIMENTS

1. General Discussion

It will become apparent that this invention is useful in many types of data transmission systems which are generally designated as quadrature-carrier amplitude-modulated transmission systems. It is most easily understood by first discussing the operation in terms of a generalized circuit diagram and then in terms of some specific embodiments.

Figure 1:
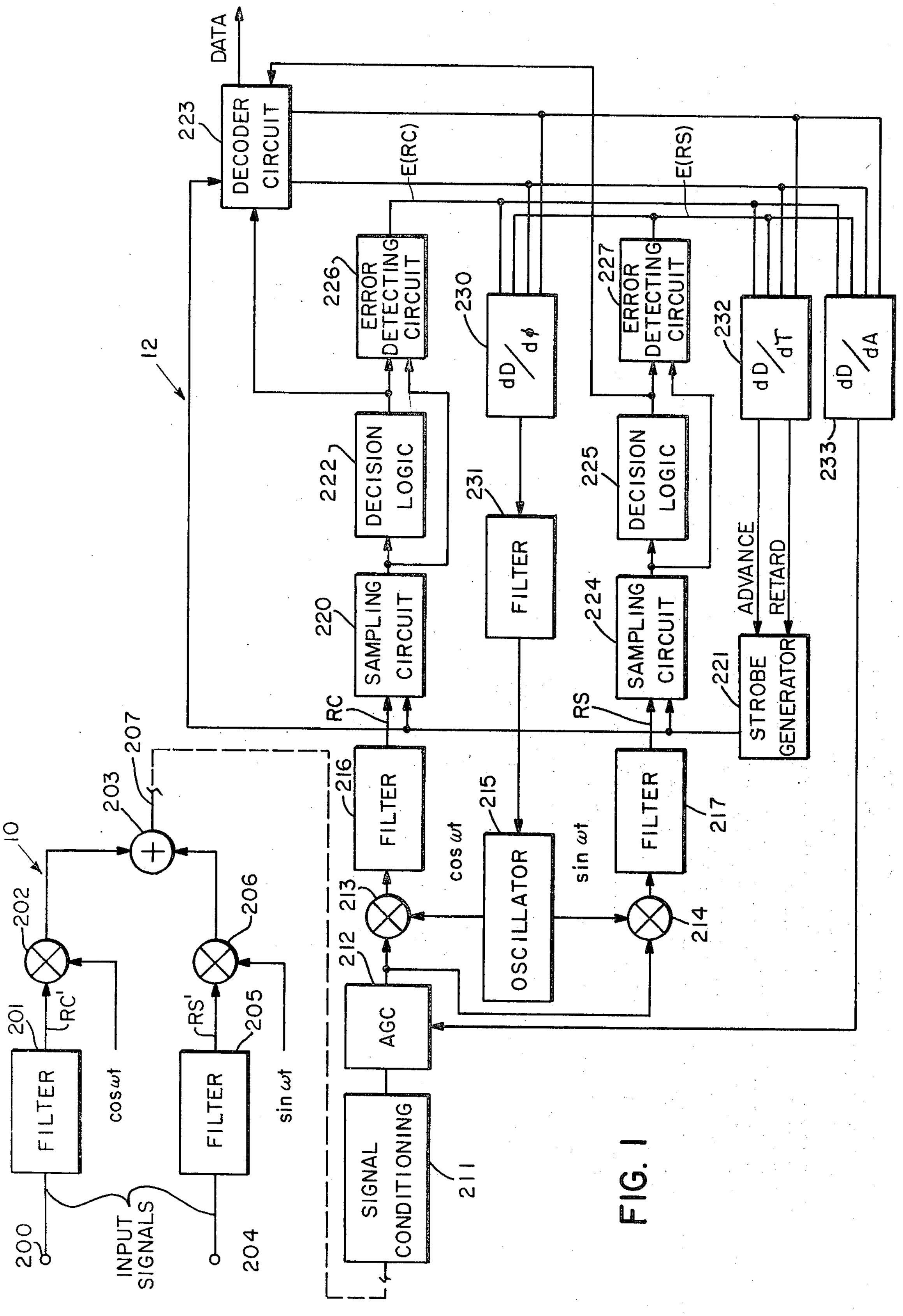
FIG. 1 is a generalized block diagram of a data transmission system using my invention.

FIG. 1 is a generalized diagram for a system adapted to encode, transmit and receive two digital input signals. In a transmitter 10, one digital input signal appears at an input terminal 200 and is coupled through a smoothing filter 201 to a modulator 202 which combines the input signal and a carrier signal designated cos ωt. The output from the modulator 202 is a modulated data signal which is one input of a modulator 203. A second digital input signal appears at an input terminal 204. A filter 205 couples the input signal to a modulator 206 which combines the input signal and a carrier frequency signal which is displaced in phase from the carrier signal applied in the modulator 202. In this case the carrier signal applied to modulator 206 is designated sin ωt. The output of the modulator 206 produces a modulated data signal and is also connected to the modulator 203. The modulator 203 output appears on a transmission line 207 as an amplitude modulated quadrature carrier signal. Thus, information can appear as phase shifts, as amplitude shifts as both of the carrier signal.

A receiver 12, also connected to the transmission line 207, receives the amplitude modulated quadrature carrier signal through a signal conditioning unit 211 which usually contains a band pass filter to reduce noise and equalizing circuits for minimizing line distortions. An automatic gain control (AGC) circuit 212 compensates changes in signal amplitude before the signal is applied to balanced demodulators 213 and 214. An oscillator 215 provides two demodulating signals, which are displaced in phase, to the demodulators 213 and 214, these signals corresponding to cos ωt and sin ωt respectively.

A filter circuit 216 receives the output from the demodulator 213. The output of circuit 216 is a demodulated data signal RC corresponding to the RC′ output from filter 201. Similarly, a filter 217 converts the output from the demodulator 214 into demodulated data signals RS corresponding to the RS′ output of the filter 205.

Ideally the RC and RS signals would correspond exactly to the RC′ and RS′ signals respectively at certain instants in time. If this were so, it would merely be necessary for a sampling circuit 220, under the control of a strobe generator 221 and decision logic circuit 222, to provide one set of inputs to a decoder circuit 223. Likewise a sampling circuit 224 and decision logic circuit 225 would provide a second input to the decoder circuit 223. The decoder circuit 223 would then generate the digital data in serial form.

However, the signals normally are not ideal and various sources of noise, circuit instabilities and transmission line characteristics introduce distortion which is subsequently identified as D. In accordance with my invention, the decision logic circuit 222 analyzes the data from the sampling circuit 220 and transmits a signal to the decoder circuit 223 indicating the ideal value for the RC signal for the data that was transmitted. An error detecting circuit 226, which receives this information and the output from the sampling circuit 220 generates an error signal E(RC). This error signal represents the difference between the expected RC signal value for the information which has been sent to the decoder circuit 223 and the actual value of the RC signal. Likewise, the decision logic circuit 225 and an error detecting circuit 227 generate an error signal E (RS) indicating the difference between the expected value of the RS signal and the actual value of the RS signal.

The circuit in FIG. 1 shows that these error signals can be used in three different ways. First, a phase control circuit comprising a dD/dΦ circuit 230 and a filter 231 analyzes the error signals E(RS) and E(RC) as a function of carrier phase. This circuitry determines the direction of a shift in carrier phase which will minimize the error signals and thereby maximize the eye opening. Control signals to the oscillator 215 from the filter 231 produce the proper phase change in the two output signals.

Secondly, a timing circuit including a dD/dτ circuit 232 monitors the outputs from the decoder circuit 223 and the error signals E (RS) and E (RC) to determine whether the strobe occurs while the eye is at a maximum opening. Circuit 232 generates ADVANCE or RETARD signals for the strobe generator 221 to effect corrections.

If the incoming signal amplitude carries data, a dD/dA circuit 233 responds to any error signals and signals from the decoder circuit 223 to determine whether gain changes will minimize the error signals.

Corrections in the operation of the automatic gain control circuit 212 are made as necessary.

Each of these correction circuits can operate independently. When two or three are combined in a single circuit such as shown in FIG. 1 the control circuits are interactive because they sample an error signal at a time which is dependent upon the instant the strobe generator 221 enables the sampling circuits 220 and 224.

Unlike prior systems, the control circuits shown in FIG. 1 operate as closed loops. By that I mean that the control circuits actually measure the eye opening at the time the sampling circuits 220 and 224 operate and then adjust its corresponding parameter to correct any error which exists. This differs to prior art systems which can be characterized as open loop systems. In those systems a set of conditions, such as maintaining the oscillator and incoming carrier signal in phase, are assumed to maximize eye opening.

2. Specific Discussion

A clearer understanding of this invention may be attained by analyzing some specific embodiments. For one specific embodiment the following discussion describes a system using quadrature carrier, differential phase modulated signals and more specifically a four-phase system which is sometimes called a quatenary phase-modulation system.

As known, a quatenary phase-modulation system receives successive sets of digital data bits; a typical set includes a pair of successive binary bits from a digital data generating device, grouped together as "dibits". It then encodes each dibit by successively shifting the phase of a carrier signal.

For example, the differential phase shifts may be:

TABLE I

| Dibit | Phase Shift |
|---|---|
| 11 | 45° |
| 10 | 135° |
| 00 | 225° (−135°) |
| 01 | 315° (−45°) |

Still referring to FIG. 1, the transmitter, generally designated by reference numeral 10 contains circuits (not shown) for generating a differential-phase-shift-keyed carrier control signals in accordance with TABLE 1. These control signals are the input signals applied to input terminals 200 and 204. The resulting quatenary phase-modulated carrier signal is then coupled onto the line 207.

Figure 2:
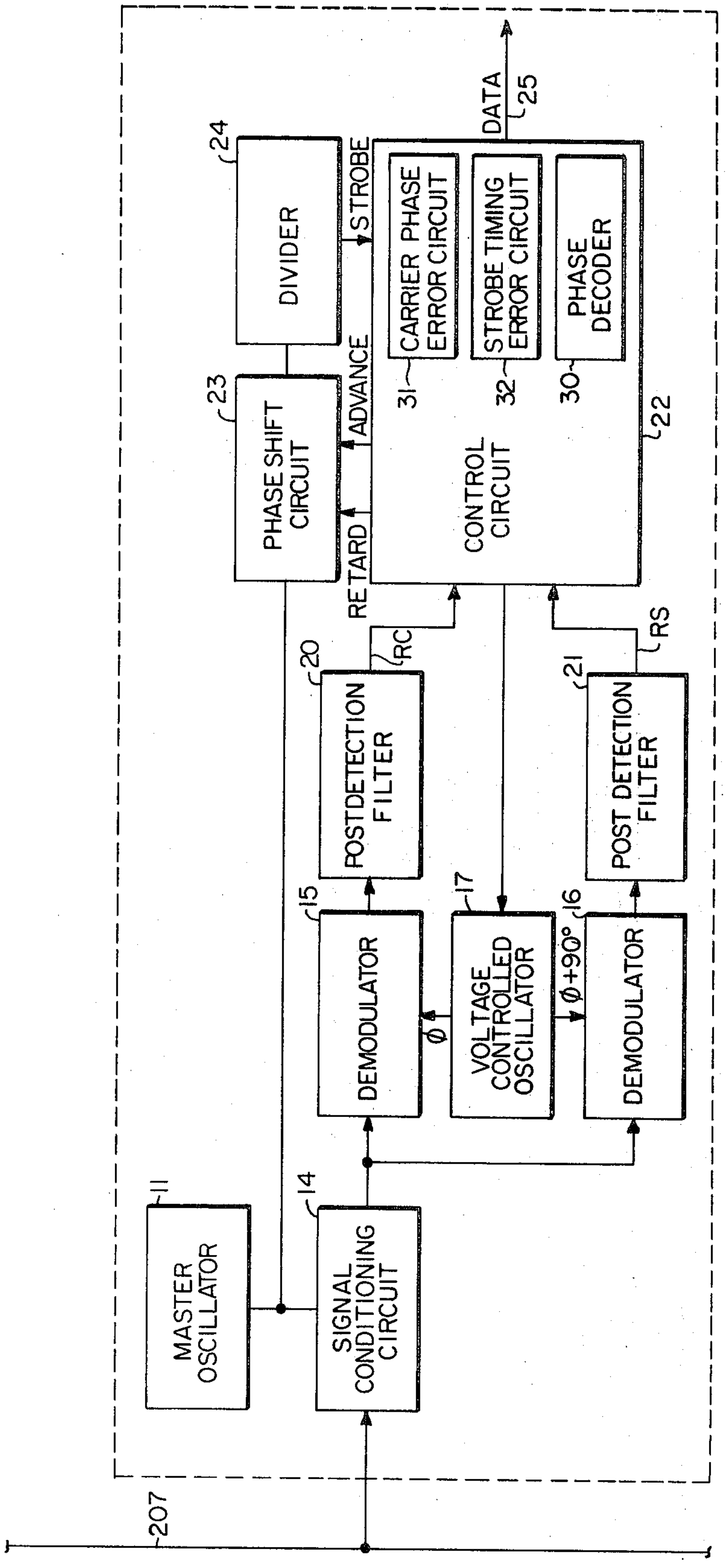
FIG. 2 is a block diagram of a receiver for a specific embodiment of the circuit shown in FIG. 1.

As specifically shown in FIG. 2, the signals from a conditioning circuit 14 which includes the circuits 211 and 212 in FIG. 1, are then processed in demodulators 15 and 16 corresponding to demodulators 213 and 214. A local voltage-controlled oscillator 17 (corresponding to the oscillator 215) provides a first reference signal of one phase (Φ) to the demodulator 15 and a second quadrature, reference signal, i.e., with a phase angle Φ + 90°, to the demodulator 16. Post-detection filters 20 and 21 receive signals from the demodulators 15 and 16 respectively and generate the RC and RS demodulated data signals.

A control circuit 22 receives these component signals. A strobe signal, also applied to the control circuit 22, is obtained from the master oscillator 11, a phase shift circuit 23 and divider 24 which constitute the strobe generator 221. The control circuit 22 also contains a phase decoder 30 which periodically samples signals from the filters 20 and 21 under the control of the strobe signal. The phase decoder 30 provides the digital data in serial form. A carrier phase error circuit 31 controls the frequency and phase of voltage controlled oscillator 17 and corresponds, in function, to the dD/dΦ circuit 230 and filter 231. ADVANCE or RETARD signals, which alter strobe signal timing, appear at the output of a strobe timing error circuit 32, which corresponds to the dD/dτ circuit 232. As all the data information in this specific system appears in the polarity of the demodulated data signals, there is no need for a gain control circuit 223.

Post detection filters 20 and 21 convert the outputs from the demodulator 15 and 16 into signals which represent the phase of the modulated data signals. Specifically, the post-detection filter 20 generates a component signal RC and its inverse or negative signal $\overline{RC}$, i.e., $\overline{RC}$=−RC, which is not shown in FIG. 2. The post detection filter 21 similarly generates a component signal RS which is in quadrature with RC and also an inverse signal $\overline{RS}$, which is also not shown.

As the phase represented by the RC and RS signals is continually changing, each of the post-detection filters 20 and 21 may generate one of five output signals. With respect to a fixed set of co-ordinates, a modulated data signal phase of 0°, 90°, 180° or 270° causes the RS and RC signals to assume one of three levels at the center of the baud time: +1, 0, −1, using 1 to represent the voltage the demodulated data signal should reach at the center of the baud time. Specifically, the values for the RC and RS signals is as follows:

TABLE 2

| Phase | RS | RC |
|---|---|---|
| 0° | 0 | +1 |
| 90° | +1 | 0 |
| 180° | 0 | −1 |
| 270° | −1 | 0 |

As apparent, these are the only four combinations which can occur. However, each signal can have three possible values, so I refer to this condition as the three-level state. During the next baud, the co-ordinates shift, so the absolute phase is ±45 or ±135. Each of the RS and RC signals then have only two values: +.7 or −.7 where 0.7 represents the value the signal should reach at the center of the baud. Specifically, the values of *RS* and *RC* are as follows:

TABLE 3

| Absolute Phase | RS | RC |
|---|---|---|
| 45° | +.7 | +.7 |
| 135° | +.7 | −.7 |
| 225° | −.7 | +.7 |
| 315° | .7 | −.7 |

In view of the possible signal combinations, I refer to this set of conditions as the two-level state.

As the modulation process always causes successive dibits to shift the carrier signal by ±45° or ±135°, the component signals constantly alternate between the two-level and three-level states. In the two-level state, each component signal can assume one of three values during the next baud. Conversely, in the three-level state, a component signal can assume one of two values in the next baud. When an oscilloscope monitors the outputs from the filters 20 and 21 with the horizontal sweep covering two baud times, the display shown in FIG. 3 results. This is a display with random data being applied to the demodulators 15 and 16 in FIG. 2. Arrow A points to the center of a conventional eye pattern. As can be seen, the RC and RS signal assume only one of two values. Therefore, I call this a "two-level eye." Arrow B points to the center of a three-level eye which results because the RC and RS signals can assume one of three values.

Figures 3, 5:
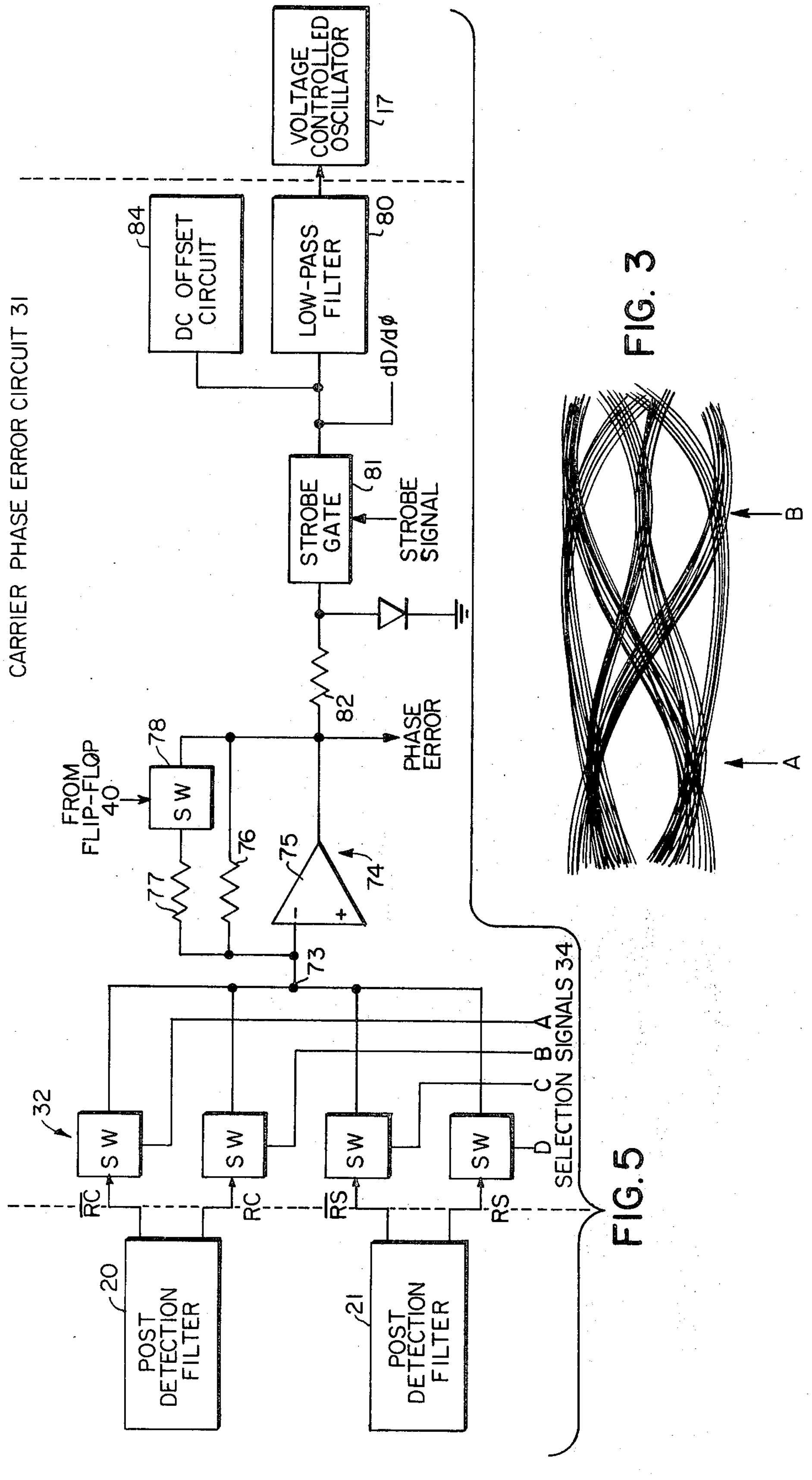
FIG. 3 is a graphical representation of an "eye pattern"
FIG. 5 is a schematic drawing including the phase error circuit constructed in accordance with my invention.

FIG. 3 depicts ideal eye openings. They have a maximum height at the center of the baud time. With distortion on the line, however, the eye can collapse and the reduced maximum may occur off center. As previously indicated, my invention compensates for this distortion by adjusting the phase of the demodulating carrier so as to maximize the eye opening and by controlling the strobe signal so the received demodulated data signals are sampled during each baud time where the eye reaches its maximum opening.

The RS and RC signals represent the absolute phase of the modulated data signals carrier at any given time. The phase decoder 30 in FIG. 2 uses this absolute phase information, generated during successive bauds, to determine the relative phase shift of the modulated carrier during successive bauds and thereby recover the digital data.

Figure 4:
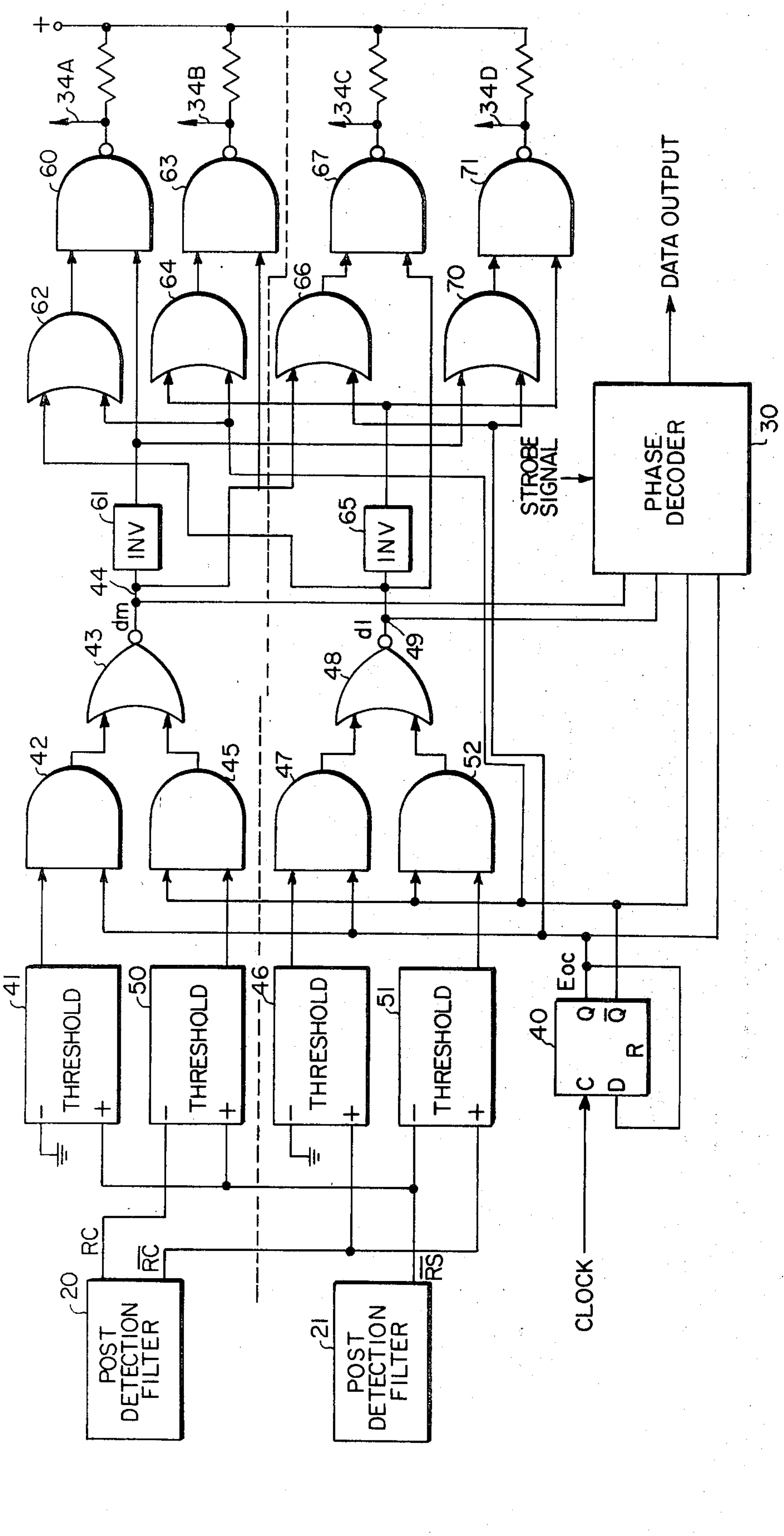
FIG. 4 is a schematic diagram of a circuit for generating digital data and for generating control signals used by the circuitry shown in FIG. 1.

Referring to FIG. 4, a flip-flop 40 alternately sets and resets in response to a clock signal at the baud rate. The flip-flop 40 resets to indicate the system is sensing a three-level eye. When set, the flip-flop 40 indicates that a two-level eye exists. As shown, the signal from the Q output of the flip-flop 40 can be designated as an Eoc signal.

When the receiver is demodulating a two-level eye, the flip-flop 40 enables a threshold circuit 41 and a gate 42 to compare the $\overline{RS}$ signal from filter 21 with a ground reference voltage and to produce an assertive output signal whenever $RS = -.7$. The gate 42 couples this signal through a NOR circuit 43 and generates assertive $d_m$ signal on a conductor 44. A gate 45, which provides the other input to the NOR circuit 43, is disabled by the flip-flop 40. Another threshold circuit 46 and a gate 47, enabled by the flip-flop 40 at the same time, monitor the $\overline{RC}$ signal so a NOR circuit 48 produces an assertive $d_l$ signal on conductor 49 whenever $RC = -.7$.

Conversely, when $RS = +.7$ the $d_m$ signal is non-assertive. Similarly, $d_l$ is non-assertive when $RS = +.7$. Using a logical 1 to indicate an assertive signal, if $d_m =$ O and $d_l = 0$, the modulated carrier signal has an absolute phase of 45°. Hence, during a two-level eye, $d_m$ and $d_l$ correspond to the absolute phase as follows:

TABLE 4

| $d_m$ | $d_l$ | Absolute phase |
|---|---|---|
| 0 | 0 | 45° |
| 0 | 1 | 135° |
| 1 | 0 | 315° |
| 1 | 1 | 225° |

During a three-level eye, $RC = 0, +1$ or $-1$ and $RS = 0, +1$ or $-1$. Therefore, it is necessary to compare the two signals with each other. A threshold circuit 50 compares the RC signal and the RS signal so that the NOR circuit 43 produces an assertive $d_m$ signal whenever RS is less than RC. A threshold circuit 51 compares RC with RS so a gate 52 and the NOR circuit 48 produce an assertive $d_l$ signal whenever $RS$ is greater than $RC$. Hence during a three-level eye, $d_m$ and $d_l$ represent the absolute phase as follows:

TABLE 5

| $d_m$ | $d_l$ | Absolute phase |
|---|---|---|
| 0 | 0 | 0° |
| 0 | 1 | 90° |
| 1 | 0 | 270° |
| 1 | 1 | 180° |

Still referring to FIG. 4 the $d_m$ signal on conductor 44 and the $d_l$ signal on conductor 49 are coupled to the phase decoder 30 along with the signals from the flip-flop 40. The indicating signals from the flip-flop 40 resolve any ambiguity in the RC and RS signals because the flip-flop 40 indicates whether a two- or three-level eye is involved. Further, the $d_m$ and $d_l$ signals correspond to the signals from the decision logic circuits 222 and 225 in FIG. 1 which are applied to the decoder circuit 223. In accordance with my invention, I also use the $d_m$ and $d_l$ signals on conductors 44 and 49 to control the oscillator 17 (FIG. 2) and the strobe signal from the divider 24. Specifically, I use the absolute phase information to generate a series of selection signals. These selection signals are coupled to the carrier phase error circuit 31 and strobe timing error circuit 32 shown in FIG. 2.

Referring again to FIG. 4, a NAND gate 60 generates an assertive selection signal 34A when the $d_m$ signal, coupled to the NAND 60 by an inverter 61, is non-assertive and an OR circuit 62 senses either (1) an assertive $d_l$ signal or (2) an output from the flip-flop 40 indicating a two-level eye.

Similarly a NAND gate 63 asserts a selection signal 34B whenever the $d_m$ signal is assertive and an OR circuit 64 senses either (1) a two-level eye or (2) a non-asserted $d_l$ signal from an inverter 65. If the $d_l$ signed is asserted, then an OR circuit 66 and NAND gate 67 produce selection signal 34C during either a two-level eye or whenever $d_m$ is asserted. Finally, an OR circuit 70 and NAND gate 71 generate a selection signal 34D when $d_l$ is not asserted and either (1) the signals represent a two-level eye or (2) $d_m$ is not asserted. Table 6 summarizes these signals.

TABLE 6

| Signal Level | Absolute Phase | Phase Signals $d_m$ | $d_l$ | Selection Signals 34 A | B | C | D |
|---|---|---|---|---|---|---|---|
| Two-level | 45° | 0 | 0 | A | | | D |
| flip-flop 40 | 135° | 0 | 1 | A | | C | |
| set | 315° | 1 | 0 | | B | | D |
| | 245° | 1 | 1 | | B | C | |
| Three-level | 0° | 0 | 0 | | | | D |
| flip-flop | 90° | 0 | 1 | A | | | |
| 40 reset | 270° | 1 | 0 | | B | | |
| | 180° | 1 | 1 | | | C | |

FIG. 5 is a detailed view of the carrier phase error circuit 31 which controls the phase of the oscillator 17. This circuit responds to signals from the filters 20 and 21 and the selection signals 34 to generate a phase error signal. Specifically, each baud time a single one or pair of switches 32 close to couple signals from the filters 20 and 21 to a summing junction 73. The summing junction 72 is the input to a scaling circuit 74 comprising an operational amplifier 75 with a first feedback resistor 76 and parallel feedback path comprising a resistor 77 and a switch 78 in series.

During a two-level eye, the flip-flop 40 (FIG. 3) closes the switch and reduces the gain of the amplifier 75. As a result the scaling circuit 74 keeps any error signals at a consistent level to thereby compensate amplitude changes between the two-level and three-level eyes.

The output from the amplifier 75 is a phase error signal which indicates at the time the strobe signal occurs whether the maximum eye opening exists. Its output signal corresponds to the output from the $dD/d\phi$ circuit 230 in FIG. 1. A low pass filter 80, corresponding to the filter 231, receives a correction signal through a strobe gate 81 responsive to the strobe signal. A resistor 82 couples the output of the amplifier 75 to the strobe gate 81 so that these components constitute a switch current source for the low pass filter 80.

The low pass filter 80 also receives a bias signal from a DC offset circuit 84. The DC offset circuit 84 is initially set so that the output from the low pass filter maintains the frequency of the voltage controlled oscillator 17 at the incoming carrier frequency.

If the eye opening is at its maximum possible value, the output from the strobe gate 81 is a pulse with a zero average value. If the eye opening is not a maximum possible value, the pulse has a finite value and polarity. This pulse will alter the low-pass filter output. The direction of the change is such that the phase of the voltage controlled oscillator 17 shifts to increase the eye opening and thereby reduce the error signal.

Figure 6:
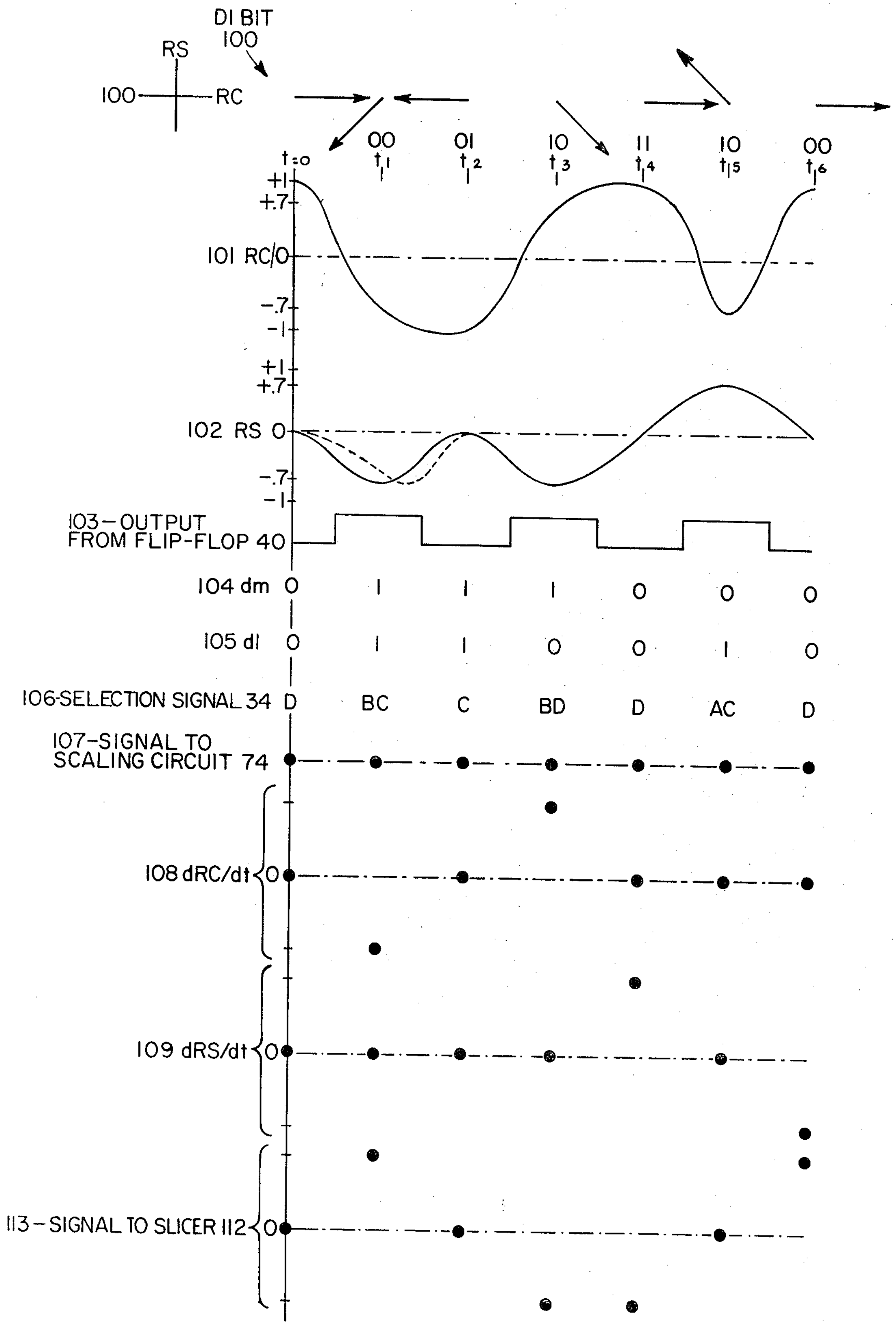
FIG. 6 graphically depicts representative signals for particular sequence of digital data signals which occur in the receiver shown in FIG. 2.

The operation of the circuit in FIG. 5 is more readily understood by referring to FIG. 6. Graph 100 shows the absolute phase vectors of the modulated data signal as they shift in response to the random data shown beneath. The absolute phase at time $t_o$ is 0°, but does not represent any known digital data because the preceding phase is not known.

Graph 101 is a plot of the in-phase *RC* signal and represents one output of the post detection filter 20. Analyzing both Graphs 100 and 101, it is apparent that at the time $t_1$, $t_3$ and $t_5$ the *RC* signal is a two-level eye signal. Graph 102 is a corresponding plot of the quadrature RS signal.

The flip-flop 40 generates the EOC signal as shown in Graph 103. The EOC signal shifts at the end of each baud time.

Graphs 104 and 105 show the logical values of signals $d_m$ and $d_1$ on conductors 44 and 49 (FIG. 4) for the *RS* and *RC* signals shown in FIG. 6. For example, at time $t_0$, the EOC signal is low. Only the threshold circuits 50 and 51 and their respective gates can generate the $d_m$ and $d_1$ values. An analysis of TABLE 6 shows that $d_m = 0$ and $d_1 = 0$ at $t_0$. During the next baud time, i.e., at $t_1$, the flip-flop 40 sets; and TABLE 6 shows that $d_m = 1$ and $d_1 = 1$.

Graph 106 shows which of the selection signals 34 are asserted in each of the time periods, as set forth in TABLE 6.

Now referring to FIGS. 5 and 6, the waveforms in Graphs 101 and 102 are idealized; that is, they are the waveforms that would be encountered in a system which is free from distortion and noise. At $t_0$, selection signal 34 has closed the switching circuit 32D in FIG. 5 to sample the RS signal. During pulse $t_0$ the average value for the *RS* signal is zero. The signal to the scaling circuit 74 is therefore zero as shown in Graph 107. At the next baud time, $t_1$, the selection signals 34B and 34C have coupled the $\overline{RC}$ and $\overline{RS}$ signals to the summing junction. During this time $RC = -.7$ while $RS = +.7$ so the average input to the scaling circuit during pulse $t_1$ is 0. In a similar fashion, Graph 107 shows that under ideal conditions signal at the summing junction 73 averages 0 during the remaining strobe times $t_2$ to $t_6$. Hence, the output from the low pass filter 81 does not change.

If the eye begins to close, there will be a finite phase error signal at the time of each of these strobe signals. For example at time $t_1$, *RS* might then become less negative as shown by the dotted line in Graph 102 which indicates a shift to the right.

With this condition, the strobe gate 81 passes a positive pulse to the low pass filter 80 at time $t_2$. This pulse decreases the output signal from the low pass filter 80 thereby advancing the phase of the signal from the oscillator 17 and restoring the balance between $\overline{RS}$ and $\dot{R}C$ at $t_2$. This increase the eye opening. Conversely, if *RS* shifts to the left, a negative pulse passes through the strobe gate 80 causing the oscillator to delay its phase.

Therefore, the circuit in FIG. 5 alters the phase of the output signal from the voltage controlled oscillator 17 to maximize eye opening. A non-distorted two-level eye has a maximum possible opening when the switches 34 select *RC* or $\overline{RC}$ and *RS* or $\overline{RS}$ signals which have equal and opposite values during the strobe signals. This produces a zero input during each strobe signal. If an error exists, i.e., the eye opening is not a maximum the strobe gate 81 couples a pulse to the low-pass filter 80. The polarity of the pulse indicates the direction of the error while the pulse magnitude indicates the magnitude of the error.

Other receiver circuits also use the strobe signal. For example, the phase decoder 30 (FIGS. 1 and 3) operates only during the strobe signal to generate the digital output signals. It is important that this strobe signal occur while the RS and RC signals, which generate the $d$ and $d_1$ signals, are most reliable. This occurs at the time during each baud when the eye opening reaches a maximum.

Figure 7:
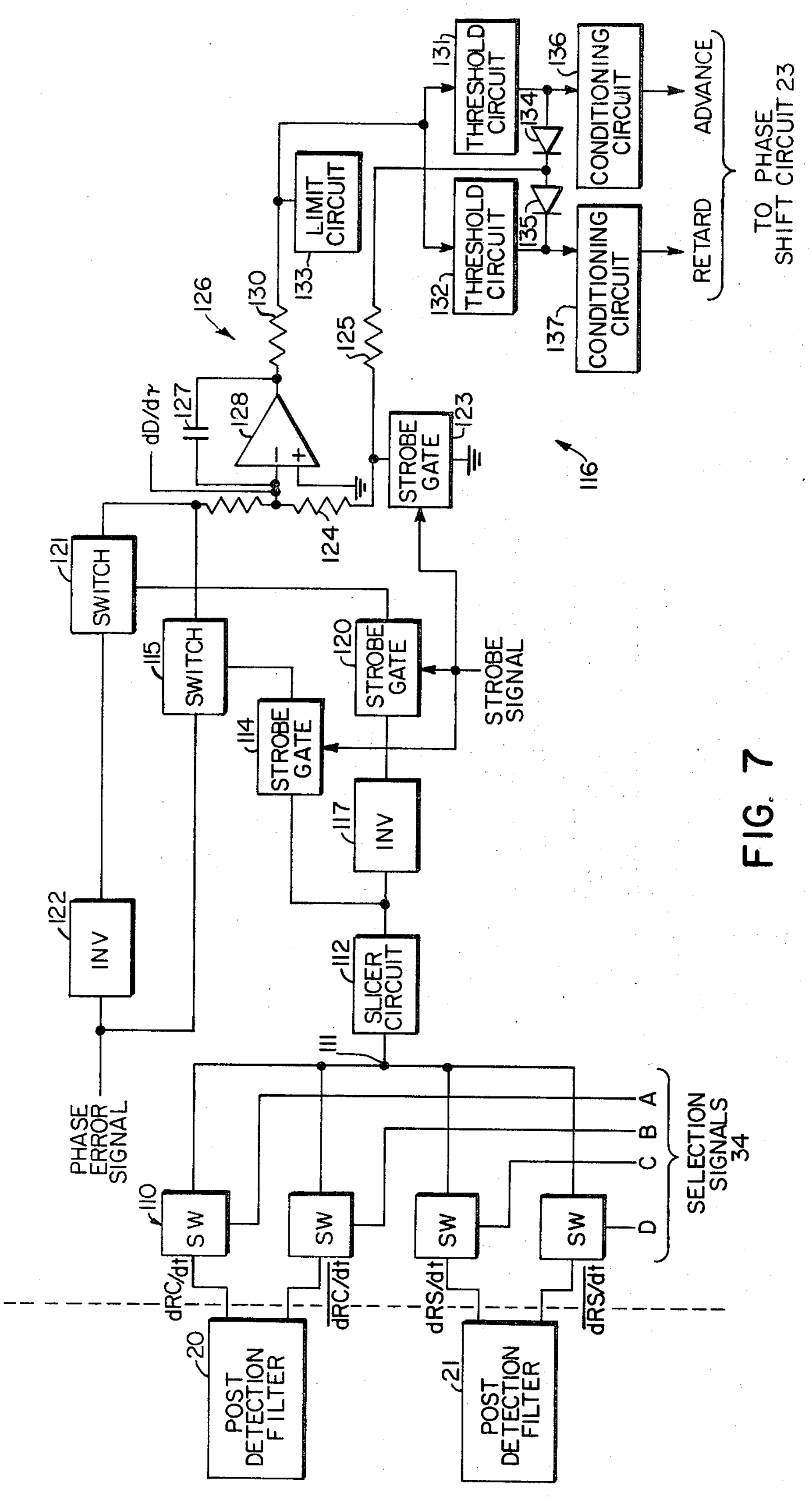
FIG. 7 is a schematic diagram for one embodiment of a timing error circuit constructed in accordance with my invention and used in the receiver in FIG. 2.

The circuit in FIG. 7 controls strobe signal timing in response to a measurement of the eye opening by generating ADVANCE and RETARD signals for the phase shift circuit 23 shown in FIG. 2. When the phase shift circuit 23 receives an ADVANCE signal, it effectively adds one or more pulses to a clock signal to advance the phase of the strobe signal. A RETARD signal causes the phase shift circuit 23 to block one or more pulses from the oscillator 11 to thereby retard the strobe signal phase.

Referring again to FIG. 7, the strobe timing error circuit samples the rate of change of the RC and RS signals at the strobe time and the PHASE ERROR SIGNAL from the amplifier 75 (FIG. 4) to generate an error signal. If the sampled PHASE ERROR SIGNAL exceeds a narrow dead band around a zero point, a pulse-height-to-pulse-width converter generates a variable-width pulse which serves as either ADVANCE or RETARD signal.

More specifically, in addition to providing the in-phase and quadrature components and their inverse values, the post detection filters 20 and 21 also generate differential signals representing the rates of change of those signals. Thus, the post detection filter 20 shown in FIG. 7 generates a signal $dRC/dt$ and $(\overline{dRC/dt})$ while post detection filter 21 generates $dRS/dt$ and $(\overline{dRS/dt})$. Graphs 108 and 109 (FIG. 6) show the values of the derivatives at the specific times $t_0$, $t_1$, $t_2$. . .

Referring to FIG. 7 again, a switching network 110 couples selected ones or pairs of the derivative signals to a summing junction 111 at the input to a slicer circuit 112. The slicer circuit 112 produces a logic 1 output when its input signal is positive and a logic 0 output when its input is negative. Analysis of the possible input signals to the slicer 112 and corresponding selection signals shows that logic 1 output from the slicer 112 indicates the polarity of the derivative of the error. As a result, a strobe gate 114, which responds to the strobe signal, couples a logic 1 output from the slicer circuit 112 to a switch 115 which closes and couples the phase error signal from the circuit shown in FIG. 5 to a constant width, variable height-to-constant height, variable width pulse converter 116. If the slicer circuit 112 produces a logic 0 output, an inverter 117 enables a strobe gate 120 to pass a strobe pulse that closes a switch 121. The switch 121 then couples the phase error signal through an inverter 122 to the circuit 116. As a result, the circuit 116 receives a correction signal which indicates the amount and direction the strobe signal timing must be changed to locate the strobe signal properly.

Circuit 116 is under the control of another strobe gate 123. When the strobe gate 123 closes during each strobe signal, it grounds a resistor 124 and a resistor 125. The resistor 124 also connects to the inverting input of an integrating circuit 126 which receives the phase error signal from the switches 115 and 121. While the strobe gate 123 is closed, the phase error signal charges a capacitor 127 in the negative feedback loop of an operational amplifier 128. A resistor 130 couples the output voltage of the integrating circuit 126 to a pair of threshold circuits 131 and 132. Threshold circuit 131 generates a positive output when its input exceeds a positive limit while the threshold circuit 132 generates a negative output when its input becomes more negative than a negative limit. A limit circuit 133 limits the maximum input of threshold circuits 131 and 132. A diode 134 couples the output of threshold circuit 131 to the resistor 125, while a diode 135 couples the output of threshold circuit 132 to the resistor 125.

If we assume that the output of the integrating circuit 126 at the termination of the strobe pulse reaches sufficient positive value, then the threshold circuit 131 turns on and the conditioning circuit generates the ADVANCE signal. At the same time, the diode 134 conducts and begins to discharge the capacitor 127. When the capacitor 127 discharges completely, the threshold circuit 131 terminates the ADVANCE signal. similarly, if a sufficient negative voltage appears at the input to the threshold circuit 132, the circuit in FIG. 7 generates a RETARD signal until the capacitor 127 discharges through the diode 135. In either case, the width of the ADVANCE or RETARD signal indicates the magnitude of the timing error. As the error increases, the capacitor 127 is charges to a higher level and so requires more time to discharge. Lengthening the time of the ADVANCE or RETARD signal enables more pulses to be added or subtracted from the output pulses from the oscillator 11. In any event, the circuit elements are chosen so the capacitor does completely discharge during a single baud time.

Four phase error and timing error combinations can occur during the operation of this specific receiver. First, the carrier phase error circuit 31 (FIG. 1) may have aligned the oscillator to produce an eye opening with a maximum possible value. In this case the integrating circuit 126 receives pulses with average values of zero because the pulse error signal has an average value of zero during those times. A second condition exists when the eye opening is at a maximum possible value, but the strobe does not occur while the eye is at a maximum opening. In this case, the phase error signal has a finite value during the strobe signal, so the strobe timing error circuit 32 produces a correction signal. In addition, the carrier phase error circuit 31 tries to adjust the carrier phase, even though improperly. However, the two circuits 31 and 32 return to proper operation after a minimum interval.

It is also possible that the carrier phase error circuit 31 is correcting carrier phase to maximize eye opening during successive baud times. When these conditions exist, the strobe signal may occur at the optimum time, i.e. when the eye, during a specific baud time, reaches a maximum opening. In this case the average of the pulses to the integrating circuit 126 is zero and no corrective action occurs. Alternatively, the strobe signal may occur at a non-optimum time, In this case the circuits 31 and 32 generate corrective signals.

In summary, this particular receive does "control" a local oscillator and strobe signal timing to improve the quality of demodulation operations by measuring and maximizing eye opening. Under ideal conditions my system operates similarly to prior circuits; that is, the voltage controlled oscillator 17 generates a signal which is in phase with the incoming carrier and the strobe signal is centered on a baud. However, unlike prior systems, my receiver controls the local oscillator in response to the recovered modulated data signals. The local oscillator phase may be out of phase with the incoming carrier if that relationship maximizes eye opening. As previously indicated, this is a "closed-loop" control circuit. My receiver also uses a "closed-loop" control circuit which controls strobe signal timing by measuring the eye opening and shifting the strobe until it occurs when the eye opening is at a maximum.

This previous discussion relates to one particular embodiment of my invention. As is apparent, however, my control system is not necessarily limited to this specific embodiment. For example, it is also possible to decode "tribits" using basically the same circuit. Tribits are sets of three digital data bits and may be transmitted either by using differential phase shift keying with increment of 22½° or by using the previously described dibit approach to encode two bits and amplitude modulation to encode the third bit. If the latter approach is taken, the control circuit 22 in FIG. 2 is modified by adding the circuitry shown in FIG. 8 and by substituting other circuits for generating the EOC signal which the flip-flop circuit 40 in FIG. 4 generates.

When the modulated carrier signal is both phase and amplitude modulated, it is necessary to determine the amplitude level at the time the data is sampled. For that reason a threshold circuit can be connected to detect the level of the carrier signal to generate an assertive signal when the amplitude is at a low level which corresponds to a two-level eye in the dibit approach. High level values would then be used to generate a non-assertive $E_{oc}$ signal. This circuitry is substituted directly for the flip-flop 40 and clock signal shown in FIG. 4; the remaining circuitry operates as described already.

In the phase decoder 30 (FIG. 4) the $E_{oc}$ signal is combined with the dm and dl signals to provide three bits in parallel to a parallel-to-serial bit converter. As apparent certain timing changes must also be made in order to accommodate the high data rates from the phase decoder 30.

Figure 8:
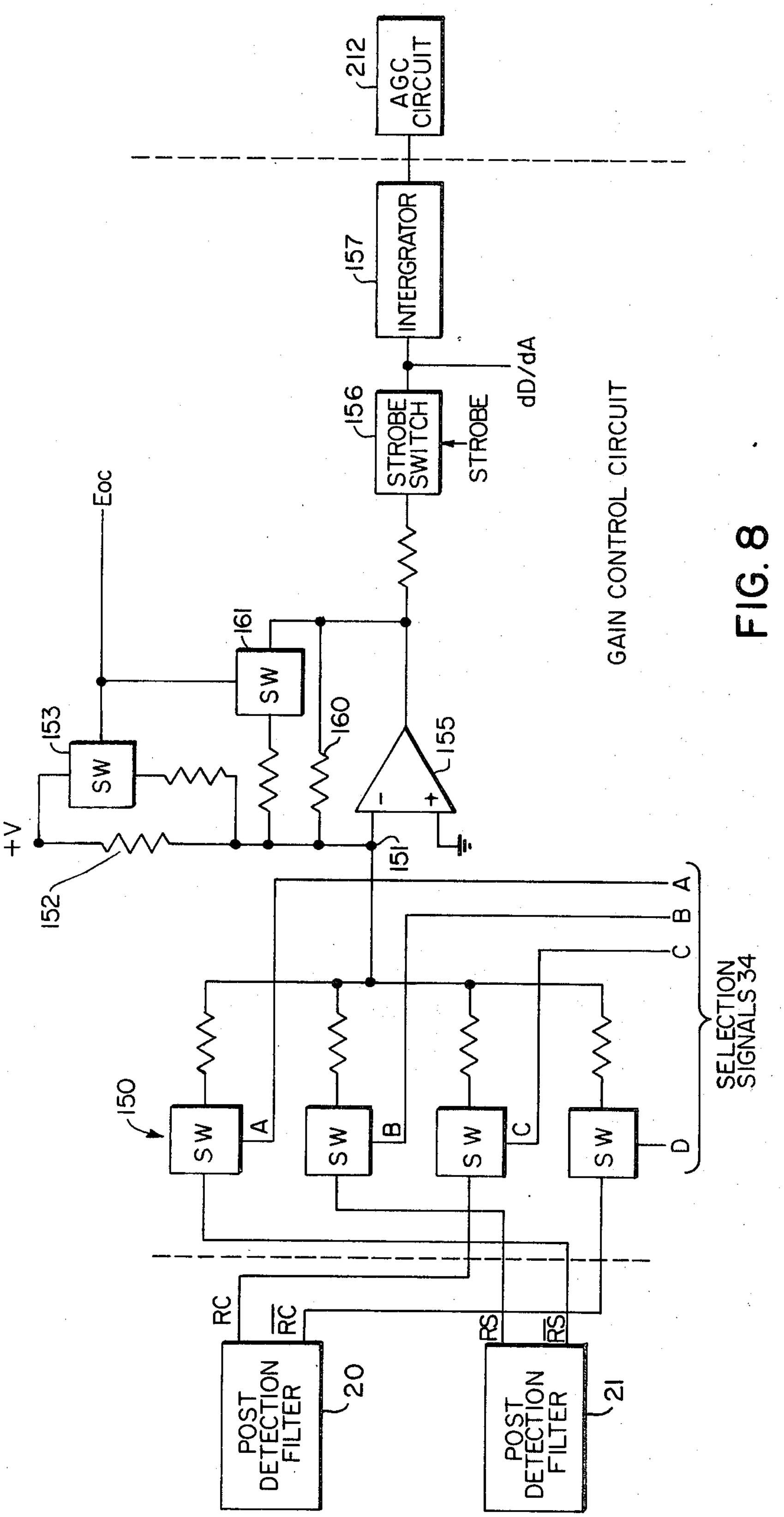
FIG. 8 is a schematic diagram for one embodiment of a gain control circuit constructed in accordance with my invention and useful in another embodiment of the receiver shown in FIG. 2.

When the carrier amplitude contains data information, further improvements in the eye opening can be made by controlling gain with circuitry equivalent to that shown in FIG. 8. Specifically post detection filters 20 and 21 connect to a switching circuit 150 to apply signals representing the values of the demodulated data signals to a summing junction 151. As shown, selection signal 34A selects or couples the $\overline{RS}$ signal to the summing junction 151 while the selection signals 34B, 34C and 34D couple the signals $RS$, $RC$ and $\overline{RC}$, respectively, to the summing junction 151. Either one or a pair of signals are coupled in accordance with Table 6. Another input to the summing junction 151 is a two-level reference signal which represents expected amplitude levels.

A resistor 152 connects summing junction 151 to a positive reference voltage while a switched resistor 153 parallels the resistor 152. When the $E_{oc}$ signal indicates that the demodulated data signals are at intermediate levels, switched resistor 153 conducts to increase the current to summing junction 151. The increase corresponds to the fact that when RC and RS are at intermediate levels both $RC$ and $RS$ are strobed by switching circuit 150 as shown in Table 6.

An amplifier 155 sums the signals and produces a voltage which a strobe switch 156 couples to an integrator 157 as an input pulse. As a given percent error between the expected and actual values of the demodulated data signals produce error signals of different magnitudes, the amplifier 155 includes a negative feedback resistor 160 and, in parallel therewith, a switched resistive feedback path 161. During a two-level signal, the error for a given percent deviation is larger than it would be for a corresponding percent deviation in a three-level signal. Therefore, the $E_{oc}$ signal causes the switched resistor 161 to reduce the feedback and decrease gain.

As a result, the strobe switch 156 couples constant width, variable-height pulses to the integrator 157 and these pulses may reverse in polarity depending upon the gain error. The integrator 157 therefore produces a variable d-c output signal which is the AGC control signal for energizing the AGC circuit 212 shown in FIG. 1.

As was true in the prior discussion of the strobe timing error circuit 32 and carrier phase error circuit 31, the gain error circuit shown in FIG. 8 is a closed loop control circuit because it measures the deviation of the demodulated data signals from expected values and then generates an error signal to correct the gain in a way to minimize the error. The system does not, as was true in prior art, rely on the assumption that a constant gain necessarily produces the best eye opening.

As now apparent, the generalized diagram in FIG. 1 may be applied to many specific data transmission systems. It is not limited to specific embodiments discussed above. Therefore, it is the object of the appended claims to cover all such variations and modifications that come within the true spirit and scope of my invention.

What I claim as new and desire to secure by Letters Patent of the United States is:

1. A receiver for a quadrature carrier, amplitude modulated signal which carries digital data in sets of digital bits, each set including at least two bits, comprising:

A. demodulating means for recovering demodulated data signals, said demodulating means including variable control means for at least one operating parameter of said demodulating means, said variable control means including strobing means responsive to the appearance of each set of data bits for generating a strobing signal, B. decoding means connected to said demodulating means and responsive to the strobing signal for converting the demodulated data signals into signals corresponding to the digital data, C. error means connected to said decoding means and said demodulating means for generating an error signal representing the difference between the actual and expected values of the demodulated data signals for each successive set of decoded digital data bits, and D. parameter control means responsive to the error signals for varying said variable control means to minimize the difference between the actual and expected values.

2. A receiver as recited in claim 1 wherein the timing of the strobing signal is an operating parameter, said parameter control means monitoring the error signal to control the timing of the strobing signal from said strobing means.

3. A receiver as recited in claim 2 wherein the amplitude of the modulated carrier signal varies as a function of data and said decoding means generates additional digital data based upon the amplitude of the carrier signal and the amplitude is an operating parameter control, said demodulating means including adjustable gain amplifier means for the incoming carrier signal, and said parameter control means monitoring said error signal to control the gain of said adjustable gain amplifier means.

4. A receiver as recited in claim 1 wherein said demodulating means includes an oscillator, and the phase of said oscillator output signal is an operating parameter, said parameter control means monitoring the error signal to control the phase of said oscillator.

5. A receiver recited in claim 4 wherein the timing of the strobing signals is a second operation parameter, said demodulator including second parameter control means monitoring the error signal to control the timing of the strobing signal from said strobing means.

6. A receiver as recited in claim 5 wherein the amplitude of the demodulated carrier signal varies as a function of data and said decoding means generates additional digital data based upon the amplitude of the carrier signals, and the amplitude is a third operating parameter, said demodulating means including adjustable gain carrier amplifier means for the incoming carrier signal and third parameter control means monitoring the error signal to control the gain of said adjustable gain amplifier means.

7. A receiver as recited in claim 4 wherein the amplitude of the modulated carrier signal varies as a function of data and said decoding means generates additional digital data based upon the amplitude of the carrier signal and the amplitude is another operating parameter, said demodulating means including adjustable gain carrier amplifier means for the incoming carrier signal and additional parameter control means for monitoring the error signal to control the gain of said adjustable gain amplifier means.

8. A receiver for incoming quadrature carrier, amplitude modulated signals modulated in response to sets of digital data, each set including at least two data bits, said receiver comprising:

A. demodulating means for recovering phase-displaced demodulated data signals from the incoming signals including a variable phase oscillator means and means for adjusting the phase of said oscillator means, B. decoding means connected to said demodulating means for converting each successive set of demodulated data signals into corresponding digital data, C. error means connected to said decoding means and said demodulating means for generating an error signal representing for each successive set of data bits the difference between the actual and expected values of the demodulated data signals for the decoded digital data, and D. carrier phase control means responsive to signals from said decoding means and said error means for generating a phase control signal for controlling the relative phases of said oscillator output and incoming carrier signals to minimize the difference between the actual and expected values of the demodulated data signals.

9. A receiver as recited in claim 8 additionally comprising:

A. means in said demodulating means for generating differential signals representing the rate of change of the demodulated data signals, B. sampling means in said demodulating means responsive to a strobe signal for periodically sampling the demodulated data signals, C. a strobe signal generator in said demodulating means decoding data signals including variable clock means for periodically generating the strobe signal, D. means in said error means responsive to the strobe signal for sampling the differential signals and error signal to generate a strobe control signal, and E. means responsive to the strobe control signal to alter the timing of said variable clock means to minimize the difference between the actual and expected values of the demodulated data signals which exists during the strobe signal.

10. A receiver as recited in claim 8 wherein said error means includes:

A. means in said decoding means responsive to the demodulated data signals for generating absolute phase signals, B. means for summing selected ones of the demodulated data signals for generating the error signal, and C. means responsive to the absolute phase signals for generating selection signals for controlling said summing means so the error signal causes said carrier phase control means to alter the phase of said oscillator output signal.

11. A receiver as recited in claim 10 additionally comprising:

A. means in said demodulating means for generating differential signals representing the rate of change of the demodulated data signals, B. means in said demodulating means for periodically sampling the output from said demodulating means in response to a strobe signal, C. a generator for periodically producing a strobe signal, said generator including a clock pulse generator, divider means for periodically generating the strobe signal including first correction means responsive to a retard signal to block pulses periodically from said clock pulse generator and second correction means responsive to an advance signal for adding pulses periodically to those received from said clock pulse generator to thereby vary the timing of the strobe signal, and means for summing selected ones of said differential signals in response to the selection signals, and D. means responsive to the summed differential signals and the error signal for generating a timing error signal representing the difference between the time of a strobe signal and the time at which the minimum difference between the actual and expected values of the demodulated data signals occurs, the timing error signal being coupled to said first or second correction means.

12. A receiver as recited in claim 11 wherein said timing error signal means includes means for generating a constant width, variable height pulse of a first polarity to indicate an early strobe timing signal or of a second polarity to indicate a late strobe timing signal and means for converting the pulse height to a constant height, variable width pulse for the first or second correction means.

13. A receiver as recited in claim 10 wherein the demodulated data signals from said demodulating means are in the form of demodulated differential phase shift keyed signal and include first and second sets of signals corresponding to first and second coordinate systems, respectively, said receiver additionally comprising:

A. coordinate means for indicating whether the component signals are in the first or second set, and B. means in said absolute phase generating means for comparing the demodulated data signals in the first set against fixed reference values and demodulated data signals in the second set against each other to obtain the absolute phase signals.

14. A receiver as recited in claim 13 wherein:

A. said variable phase oscillator means comprises voltage controlled oscillator means responsive to the phase control signal, B. said carrier phase control means includes:

1. a low pass filter connected to said voltage controlled oscillator, and
2. gating means responsive to a strobe signal for coupling selected summed demodulated data signals to said low pass filter to thereby alter the phase control signal, and C. said error means including a strobe generator responsive to a minimum difference between actual and expected values for the modulated data signals for generating the strobe signal.

15. A receiver as recited in claim 14 wherein the time between successive phase shifts of the modulated data signal constitutes a baud time:

A. said strobe generator including:

1. clock means for generating high frequency clock pulses,
2. divider means responsive to said clock pulses for normally generating the strobe signal at the center of a baud time, said divider including first correction means responsive to an advance signal to cause said strobe signal to occur earlier in a baud time and second correction means responsive to a retard signal to cause the strobe signal to occur later in a baud time, B. means in said demodulator means for generating differential signals representing the rate of change of the demodulated data signals, said means being responsive to the selection signals for generating a differential error signal, C. means responsive to the summed demodulated data signals at the time the strobe signal appears for generating a constant width, variable height pulse, and D. conversion means for converting the pulse signal to a constant height, variable width timing error pulse for generating the advance or retard signal depending upon the polarity of the timing error pulse.

16. A receiver as recited in claim 8 additionally comprising:

A. adjustable gain amplifier means for the incoming carrier signals, and

B. gain control means responsive to signals from said decoding means and said error means for generating a gain control signal for said adjustable gain amplifier means to minimize the difference between the actual and expected values of the modulated data signals.

17. A receiver as recited in claim 16 wherein said gain control means includes:

A. means for comparing selected demodulated data signals with a reference level to generate a different signal, and B. means to specifically sample the difference signal, C. filtering means to convert the output from said difference signal sampling means to generate the gain control signal.

18. A receiver for incoming quadrature carrier, amplitude modulated signals modulated in response to sets of digital bits, each set including at least two bits, said receiver comprising:

A. means including a sampling means for recovering the digital data,

B. means for generating phase displaced demodulated signals and differential signals representing the rate of change of the demodulated data signals, C. variable timing means for generating a strobe signal for controlling the timing of said sampling means, D. means generating an error signal corresponding to the difference between actual and expected values of each successive set of the demodulated data bits, and E. means responsive to the strobe signal and the error signal for generating a timing control signal, said variable timing means being responsive to the timing control signal to shift the timing of the strobe signal to the minimize the difference between the actual and expected values of the demodulated data signals.

* * * * *

UNITED STATES PATENT OFFICE

CERTIFICATE OF CORRECTION

Patent No. 3,818,347 Dated June 18, 1974

Inventor(s) Jerry L. Holsinger

It is certified that error appears in the above-identified patent and that said Letters Patent are hereby corrected as shown below:

Column 2, line 54, delete "chain" and insert--gain--

Column 6, line 18, "RC" (second occurrence) should be --$\overline{RC}$--
line 19, "RC" (first occurrence) should be --RC--
line 22, "RS" should be --RS--

Column 7, line 63, "RS" should be --$\overline{RS}$--
line 66, "RC" should be --RC--
same line, "RS" should be --RS--

Column 8, line 36, delete "signed" and insert --signal--

Column 10, line 16, delete "increase" and insert --increases--
line 37, delete "d" and insert --$d_m$--
line 62, delete "represending" and insert --representing--

Column 11, line 51, after the period, delete "similarly" and and insert --Similarly--
line 58, delete "charges" and insert --charged--

Column 18, line 4, delete "and"
line 5, after "signal," insert --and--
line 32, after "to" delete "the"

Signed and Sealed this

*sixteenth* Day of *March 1976*

[SEAL]

*Attest:*

RUTH C. MASON
*Attesting Officer*

C. MARSHALL DANN
*Commissioner of Patents and Trademarks*